US008214252B2

(12) United States Patent
Suter et al.

(10) Patent No.: US 8,214,252 B2
(45) Date of Patent: *Jul. 3, 2012

(54) SYSTEM COMPRISING A CONSUMER GOOD AND SERVER AND A METHOD TO BESTOW AN ADVANTAGE WITH A MONETARY VALUE

(75) Inventors: Torsten Suter, Molfsee (DE); Marcus Regensburger, Molfsee (DE)

(73) Assignee: Rocks Intertainment GmbH, Hamburg (DE)

( * ) Notice: Subject to any disclaimer, the term of this patent is extended or adjusted under 35 U.S.C. 154(b) by 722 days.

This patent is subject to a terminal disclaimer.

(21) Appl. No.: 12/219,505

(22) Filed: Jul. 23, 2008

(65) Prior Publication Data
US 2009/0030799 A1    Jan. 29, 2009

Related U.S. Application Data

(60) Provisional application No. 60/935,076, filed on Jul. 25, 2007.

(51) Int. Cl.
*G06Q 40/00* (2012.01)
*G06Q 17/00* (2006.01)
(52) U.S. Cl. .................. 705/14.1; 235/375
(58) Field of Classification Search ........... 705/35–45, 705/1.1, 14.1
See application file for complete search history.

(56) References Cited

U.S. PATENT DOCUMENTS

| | | | |
|---|---|---|---|
| 5,341,429 A * | 8/1994 | Stringer et al. .................. 705/52 |
| 8,014,505 B2 * | 9/2011 | Lee et al. .................. 379/114.2 |
| 8,028,892 B2 * | 10/2011 | Regensburger et al. ...... 235/375 |
| 2004/0073491 A1 * | 4/2004 | Suh .................. 705/26 |
| 2004/0233040 A1 * | 11/2004 | Lane et al. .................. 340/5.86 |
| 2005/0203854 A1 * | 9/2005 | Das et al. .................. 705/64 |
| 2006/0106679 A1 * | 5/2006 | Rosenhaft et al. .................. 705/26 |
| 2006/0117378 A1 * | 6/2006 | Tam et al. .................. 726/3 |
| 2006/0208071 A1 * | 9/2006 | Chang et al. .................. 235/383 |
| 2007/0063027 A1 * | 3/2007 | Belfer et al. .................. 235/381 |
| 2007/0288267 A1 * | 12/2007 | Fou .................. 705/2 |
| 2008/0027814 A1 * | 1/2008 | Kulakowski et al. .................. 705/14 |
| 2008/0142599 A1 * | 6/2008 | Benillouche et al. ..... 235/462.41 |
| 2009/0065579 A1 * | 3/2009 | Grant et al. .................. 235/385 |
| 2009/0106042 A1 * | 4/2009 | Maytal et al. .................. 705/1 |
| 2010/0077323 A1 * | 3/2010 | Hunter .................. 715/760 |

FOREIGN PATENT DOCUMENTS

JP    2007087126    *    4/2005

OTHER PUBLICATIONS

"New NeoMedia Patent Covers Mobile Marketing-Enabling Technology for the Capture and Processing of Bar Codes with Camera Cell Phones", Business Wire. New York: Feb 2, 2006. p. 1.*
"3M and Verify Team for Brand Protection and Authentication Solutions", Wireless News. Conventry: Apr. 13, 2007. p. 1.*

* cited by examiner

*Primary Examiner* — Ella Colbert
*Assistant Examiner* — Mohammad Z Shaikh
(74) *Attorney, Agent, or Firm* — Paul Vincent

(57) ABSTRACT

A system comprising a consumer good, especially a packet of cigarettes or packet of pharmaceutical products, and a server has a consumer good fitted with a concealed code, wherein the code is associated with an advantage having a monetary value and can be transmitted to a server via a telecommunication link, the server being used to check whether the code is registered as valid, and depending on the result of this test, an advantage with a monetary value is credited by the server to the telecommunication number of the caller.

8 Claims, 1 Drawing Sheet

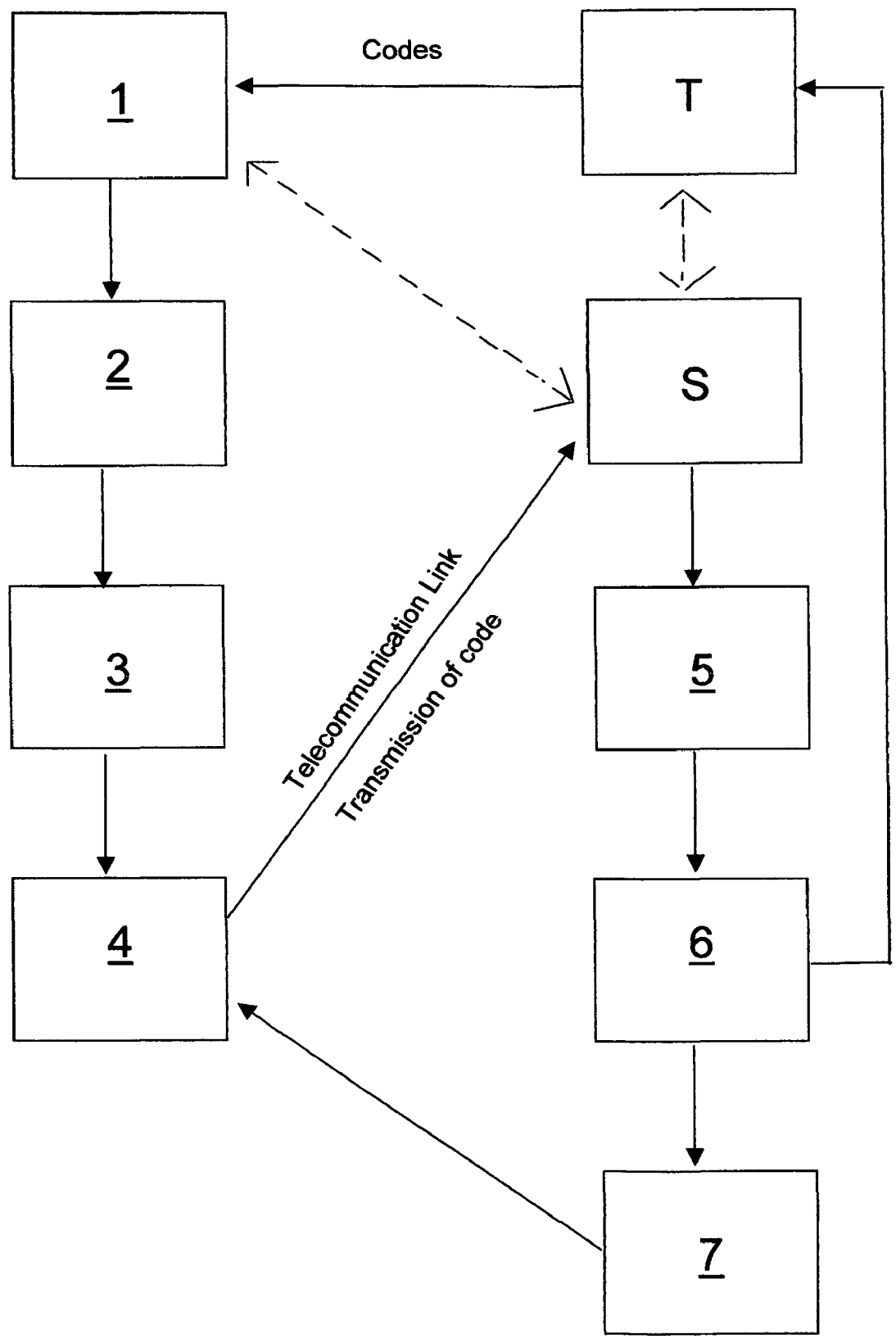

SYSTEM COMPRISING A CONSUMER GOOD AND SERVER AND A METHOD TO BESTOW AN ADVANTAGE WITH A MONETARY VALUE

This application claims benefit to 60/935,076 filed on Jul. 25, 2007 the entire disclosure of which is hereby incorporated by reference.

BACKGROUND OF THE INVENTION

The present invention relates to issue of a consumer good to the final consumer and, in particular, the constitution of a consumer good at the time it is issued to the final consumer or in preparation for issue to the final consumer. The consumer good may be, for example, a packet of cigarettes or packet of pharmaceutical products or athletic shoes, but not telephone items such as calling cards. Such consumer goods are usually offered to the final consumer or issued to the final consumer with a brand identity. The final consumer associates the brand identity of the consumer good with special notions of quality, or wishes to purchase a consumer good of a particular brand for other reasons. The manufacturers of brand articles and also final consumers frequently fall victim to counterfeits. The consumer goods are not marketed by the company with the legal right to use the brand, rather as a counterfeit/pirated good deceptively using the brand of the rightful owner. Final consumers often have little chance of distinguishing between genuine goods and counterfeit goods.

The object of the present invention is to provide final consumers a better way of checking whether they have purchased genuine goods or counterfeits.

There is also a basic problem that manufacturers of consumer goods encounter difficulty establishing customer loyalty systems because the final consumers are not usually known to them. A further object of the present invention is therefore to improve ways of achieving customer loyalty using technical means when consumer goods are purchased.

SUMMARY OF THE INVENTION

This object is solved inventively by a system comprising a consumer good, especially a packet of cigarettes or packet of pharmaceutical products, and a server, wherein the consumer good is fitted with a concealed code, the code being associated with an advantage having a monetary value and can be transmitted to a server via a telecommunication link, wherein the server is used to check whether the code is registered as valid, and wherein, depending on the result of this check, an advantage with a monetary value is credited by the server to the telecommunication number of the caller.

According to the invention, it is therefore suggested that the consumer goods concerned be fitted with a code by the manufacturer, wherein the code is fitted to the consumer good in such a way that it can only be ascertained by the rightful purchaser and/or cannot be non-destructively ascertained on the consumer good. After the rightful user or final consumer has purchased the consumer good and has ascertained the concealed code, he or she establishes a telecommunication link to a server and transmits the previously ascertained code to the server. The server then checks whether the code has been registered as valid. If it has, the caller is allocated an advantage with a monetary value, which is credited to his telecommunication number by the server. This informs the caller that the consumer good that he or she has purchased is a genuine product of the legitimate manufacturer. Moreover, bestowing an advantage with a monetary value strengthens the loyalty of the final consumer to the manufacturer's consumer good or brand.

In one embodiment of the invention, the code could be inside the packaging and invisible from the outside. In this case, the code can only be ascertained by opening the packaging of the consumer good. In a further advantageous embodiment, it is conceivable for the code to be covered in a layer that cannot be removed non-destructively. In this case, the code could be ascertained by removing, especially scratching off, a layer with the appropriate properties. It is then apparent if a code has been viewed by an unauthorized third party.

In the simplest and most advantageous case, the code comprises a string of numerals and letters. Such a code is easy to enter into equipment and can be easily transmitted to a server via a telecommunication link.

Moreover, it is especially advantageous if the server is constituted such that it stores the transaction of the advantage with a monetary value together with the code. This enables simple implementation of technical mechanisms to prevent multiple crediting if transmission of the code is repeated.

In a further advantageous embodiment of the invention, the server is additionally constituted such that it stores the telecommunication number. This enables individual identification of the rightful owner for the purposes of further development of customer loyalty systems within the framework of the law.

Furthermore, it is especially advantageous if the server is constituted such that it transmits information to the caller, depending on the result of checking the code. If this check reveals the code to have been registered as valid, this can be communicated to the user via the same and preferably still existing telecommunication link. It is also conceivable for an SMS message to be sent to the user after the end of the telecommunication link. This information could inform the caller that he or she has purchased a genuine product and/or that his or her telephone number has been credited with an advantage having a monetary value. If the check reveals that the code is not registered as valid, for example, because it has already been transmitted or because it is a code that has never been registered as valid, it is probably a counterfeit item. In this case, no advantage with a monetary value is credited, and the caller is advantageously informed of this in a suitable manner, preferably via a telecommunication link.

The present invention also comprises a method for assigning an advantage with a monetary value with the characteristics of the independent method claim. Advantageous further measures are given in the dependent method claims.

In the implementation of the inventive system comprising a consumer good and server and/or in the implementation of the inventive method, a manufacturer of a certain consumer good can approach, for example, a telecommunication network operator (provider) and acquire a number of codes from the latter. If a telecommunication customer of this telecommunication network operator purchases a consumer good fitted with a code as the final consumer, he or she can benefit from being credited with the advantage with a monetary value and checking the authenticity of the good by establishing a telecommunication link with this telecommunication network operator. It is also conceivable for the manufacturer of a consumer good to operate a telecommunication network itself or merely administer the server. In this case, the specific codes are not acquired from a telecommunication operator but they can be issued and administered by the manufacturer of the consumer good itself. If a final consumer then establishes a telecommunication link to the server, which is operated or administered by the manufacturer, it is conceivable that the caller's telecommunication network operator could be ascertained from this server. On the initiative of and via this server, the crediting or transaction of an advantage with a monetary value for the telecommunication number is then performed by the previously ascertained telecommunication network operator.

In any case, the final consumer, as the purchaser of the consumer good, only establishes one telecommunication link, and the code on the consumer good previously ascertained by him or her is transmitted to the server via this telecommunication link. By this simple measure, the final consumer, as the caller, can obtain an advantage having a monetary value, and is also assured of having purchased the genuine article.

Further characteristics, details and advantages of the invention result from the attached claims and from the drawing and the following description of a preferred embodiment of the inventive system. The drawing shows the following:

BRIEF DESCRIPTION OF THE DRAWING

The FIGURE A flowchart of the inventive system and/or method

DESCRIPTION OF THE PREFERRED EMBODIMENT

The inventive system is explained below using a flowchart:

During the manufacture or packaging of consumer goods or in a later step, but still within the sphere of influence of the manufacturer of the consumer goods, these consumer goods are fitted with concealed codes (Step 1). The codes have either first been purchased from a telecommunication network operator T by the manufacturer, or the manufacturer assigned them itself. The consumer goods fitted with the concealed code in this way are issued to the final consumer in Step 2. The final consumer ascertains the concealed code in Step 3. In Step 4, the final consumer establishes a telecommunication link with a server, and the previously ascertained code is transmitted to the server S via this telecommunication link. The server then checks in Step 5 whether the code is registered as valid. Depending on the result of this check, in Step 6, an advantage with a monetary value (e.g. a certain credit amount) is then credited to the telecommunication number of the caller by the server, provided the code is found to be registered as valid. The telecommunication network operator can be prompted to perform this crediting of an advantage having a monetary value in any way on the initiative of the server. It has already been indicated that the server can be assigned directly to the telecommunication network operator T or can be operated by the latter (indicated by the dashed arrow). It is also conceivable for the server to be assigned to or operated by the manufacturer of the consumer good (also indicated by a dashed arrow).

It is also conceivable that, after the check, information be communicated on the initiative of the server via a telecommunication link to the caller (Step 7). This can inform the caller that an advantage with a monetary value has been credited to his or her telephone number and that he or she has purchased a genuine article or the caller is informed that the check has shown that the code is not registered as valid, thus indicating a counterfeit.

We claim:

1. A method for bestowing an advantage with a monetary value or for crediting a telecommunication account, the method comprising the steps of:
    a) generating a plurality of unique codings;
    b) storing the plurality of unique codings generated in step a) using a server;
    c) hiding each unique coding by covering each coding with a layer which cannot be removed non-destructively;
    d) transferring the hidden codings to a manufacturer or distributor of the consumer item for association of one hidden unique coding with each consumer item;
    e) receiving a telecommunication message from a consumer, the consumer having acquired the consumer item, exposed the hidden coding associated with the consumer item by destroying the layer covering the coding and detected the exposed coding, wherein the message is transmitted by a telecommunication device and contains the previously hidden unique coding associated with the acquired consumer item as well as a telecommunication number of the telecommunication device sending the message;
    f) storing, using the server, the unique coding and the telecommunication number of the telecommunication device;
    g) comparing the coding received in step e) with the plurality of unique codings stored in step b);
    h) informing the telecommunication device of the consumer that the acquired consumer item is or is not authentic; and
    i) crediting an advantage with a monetary value to the telecommunication number should the acquired consumer item be authentic.

2. The method of claim 1, wherein the coding consists essentially of a string of numerals and letters.

3. The method of claim 1, wherein the advantage having a monetary value is credit on a telecommunication account.

4. The method of claim 1, wherein the server stores the transaction of the advantage with a monetary value together with the coding.

5. A device for bestowing an advantage with a monetary value or for crediting a telecommunication account, the device comprising:
    means for generating a plurality of unique codings;
    means for storing the plurality of unique codings;
    means for hiding each unique coding by covering each coding with a layer which cannot be removed non-destructively;
    means for transferring the hidden codings to a manufacturer or distributor of the consumer item for association of one hidden unique coding with each consumer item;
    means for receiving a telecommunication message from a consumer, the consumer having acquired the consumer item, exposed the hidden coding associated with the consumer item by destroying the layer covering the coding and detected the exposed coding, wherein the message is transmitted by a telecommunication device and contains the previously hidden unique coding associated with the acquired consumer item as well as a telecommunication number of the telecommunication device sending the message;
    means for storing the unique coding and the telecommunication number of the telecommunication device;
    means for comparing the received coding with the plurality of previously stored unique codings;
    means for informing the consumer that the acquired consumer item is or is not authentic; and
    means for crediting an advantage with a monetary value to the telecommunication number should the acquired consumer item be authentic.

6. The device of claim 5, wherein said coding is disposed inside a packaging and is invisible from an outside.

7. The device of claim 5, wherein said coding consists essentially of a string of numerals and letters.

8. The device of claim 5, wherein said server is structured to store a transaction of said advantage having a monetary value together with said coding.

* * * * *